US009897991B2

(12) United States Patent
Yahaba et al.

(10) Patent No.: US 9,897,991 B2
(45) Date of Patent: Feb. 20, 2018

(54) MACHINE TOOL

(71) Applicant: DMG MORI SEIKI CO., LTD., Nara (JP)

(72) Inventors: Hiroshi Yahaba, Sapporo (JP); Takaaki Soga, Nara (JP)

(73) Assignee: DMG MORI SEIKI CO., LTD., Nara (JP)

( * ) Notice: Subject to any disclaimer, the term of this patent is extended or adjusted under 35 U.S.C. 154(b) by 463 days.

(21) Appl. No.: 14/518,575

(22) Filed: Oct. 20, 2014

(65) Prior Publication Data
US 2015/0120036 A1    Apr. 30, 2015

(30) Foreign Application Priority Data

Oct. 24, 2013  (JP) ................................. 2013-221045

(51) Int. Cl.
G05B 19/18     (2006.01)
G05B 19/401    (2006.01)

(52) U.S. Cl.
CPC ......... G05B 19/18 (2013.01); G05B 19/4015 (2013.01); *G05B 2219/32128* (2013.01); *G05B 2219/50141* (2013.01); *G05B 2219/50143* (2013.01)

(58) Field of Classification Search
CPC ................ G05B 19/18; G05B 19/4015; G05B 2219/50143; G05B 2219/50141; G05B 2219/32128
See application file for complete search history.

(56) References Cited

FOREIGN PATENT DOCUMENTS

| JP | 03220604 A | 1/1991 |
|----|------------|--------|
| JP | 05204419 A | 8/1993 |
| JP | 08263116 A | 10/1996 |
| JP | 200137514 A | 5/2000 |
| JP | 2002055702 A | 2/2002 |
| JP | 2003058216 A | 2/2003 |
| JP | 2003202909 A | 7/2003 |
| JP | 2006004128 A | 1/2006 |
| JP | 2008015740 A | 1/2008 |
| JP | 2010131722 A | 6/2010 |

OTHER PUBLICATIONS

Ong et al., "An internet-Based Virtual Based CNC Milling System", 2002 Springer-Verlag London Limited.*
Pichler et al., "User Centered Framework for Intuitive Robot Programming", 2010 IEEE.*

* cited by examiner

*Primary Examiner* — Carlos Ortiz Rodriguez
(74) *Attorney, Agent, or Firm* — Miller, Matthias & Hull LLP

(57) ABSTRACT

A machine tool includes a movable structure 3, a numerical control unit 22, an external input unit 39 having a dedicated operation key for inputting an operation signal associated with at least a movement end point to which the movable structure 3 is moved, a display unit 39 displaying an image, a display control unit 25 controlling the display on the display unit 39, an input control unit 24 processing a signal input from the external input unit 39, and a movement path setting unit 32 receiving the operation signal input from the external input unit 39 and setting a movement path for moving the movable structure 3 corresponding to the operation signal to the movement end point according to a predetermined setting condition. The display control unit 25 displays an image relating to the movement path set by the movement path setting unit 32 on the display unit 39.

21 Claims, 7 Drawing Sheets

MACHINE TOOL

FIELD OF THE DISCLOSURE

The present disclosure relates to a machine tool including one or more movable structures, a drive mechanism unit driving the movable structures, and a numerical control unit controlling an operation of the drive mechanism unit, and more specifically, relates to a machine tool including a dedicated operation key for inputting an operation signal which is set to move the movable structures and is associated with at least a movement end point, the machine tool being configured to move the movable structures in accordance with the operation signal input from the operation key.

BACKGROUND OF THE DISCLOSURE

In the field of an industrial machine including a movable structure which is numerically controlled, the movable structure is positioned at a position determined using a predetermined machine zero point as a reference under numerical control. Further, when the movable structure is operated in accordance with an NC program, the operation start position is usually set to the machine zero point. Therefore, the movable structure needs to be returned to the machine zero point in preparation for the operation before the NC program is started.

As one of methods of returning a movable structure to a machine zero point, a method disclosed in Japanese Unexamined Patent Application Publication No. 2000-137514 has conventionally been known. The zero return method disclosed in this document relates to an industrial robot controlled in accordance with an NC program, and in the method, movement of the robot to predetermined target positions is controlled by a subprogram and an operation program for returning the robot from each target position to the machine zero point is previously prepared, and, in the case where operation of the robot is interrupted before the robot reaches a certain target position, when restarting the robot, the robot is first moved to the target position, before reaching which the operation of the robot was interrupted, and then the operation program for returning the robot from the target position to the machine zero point is started to return the robot to the machine zero point.

SUMMARY OF THE DISCLOSURE

However, in the case of a machine tool, a position at which a movable structure such as a tool rest is to be positioned is greatly varied because it differs depending on a machining object. If a method of returning a movable structure to a machine zero point in accordance with a previously prepared operation program similarly to the above-described conventional method is adopted, numerous operation programs have to be prepared, and therefore adopting such a method is not a practical approach.

Therefore, in the field of machine tools, conventionally, when a zero return command is input from a zero return key provided in an operation panel or the like, for example, in the case of two-axis control, the movable structure is moved in accordance with a predetermined setting condition, such as driving the axes at the same speed, under control by a numerical control unit and thereby returned to the machine zero point, instead of being returned to the machine zero point in accordance with a previously prepared operation program.

However, in recent years, machine tools have been adapted for combined machining. In such a machine tool, it is normal that, within a movable area of a certain movable structure, a structure which interferes with the movable structure exists or another movable structure exists. In such a case, if an operator performs the zero return operation without sufficiently checking for interference by visual observation, this may cause such a serious accident that the movable structure interferes with another structure or the movable structure interferes with another movable structure.

Further, in the field of machine tools, besides the machine zero point, an operator designates an arbitrary position and inputs a command for moving a movable structure to the designated position as appropriate, thereby moving the movable structure to the designated position. Also in this case, a more accurate safety check is required similarly to the zero return operation.

The present disclosure has been achieved in view of the above-described circumstances, and an object thereof is to provide a machine tool configured to be able to, when moving a movable structure to a predetermined position, more accurately check the safety thereof.

To solve the above-described problems, a machine tool is disclosed herein that includes one or more movable structures, a drive mechanism unit driving the movable structures, a numerical control unit controlling an operation of the drive mechanism unit, an external input unit including a dedicated operation key for inputting an operation signal which is set to move the movable structures and is associated with at least a movement end point and inputting the operation signal from the operation key to the numerical control unit, a display unit displaying an image, a display control unit controlling display on the display unit, and an input control unit processing a signal input from the external input unit, wherein:

the machine tool further comprises a movement path setting unit receiving the operation signal input from the external input unit and setting a movement path for moving the movable structure corresponding to the operation signal to the movement end point in accordance with a predetermined setting condition, and the display control unit is configured to display an image relating to the movement path set by the movement path setting unit on the display unit.

According to the machine tool of the present disclosure having the above-described configuration, when the operation key of the external input unit is pressed down and the operation signal is input from the external input unit, the movement path setting unit first sets a movement path for moving the movable structure corresponding to the operation signal to the movement end point in accordance with a predetermined setting condition. Then, an image relating to the movement path thus set is generated by the display control unit and the generated image is displayed on the display unit.

Thus, according to this machine tool, after inputting the operation signal from the external input unit, an operator can recognize how the movable structure to be operated is operated by the operation by checking the image representing the movement path displayed on the display unit. Further, by checking a positional relationship between the movable structure to be operated and other structures by visual observation or the like in addition to the image relating to the movement path, the operator can confirm whether the movable structure can be moved safely.

It is noted that, as for the setting condition, the following conditions can be given as examples. However, the present disclosure is not limited to them.

1) In the case where there is a plurality of movement axes for moving the movable structure to be operated, the movable structure is moved at the same speed for each of the movement axes.

2) In the case where there is a plurality of movement axes for moving the movable structure to be operated, the movement axes are prioritized and the movable structure is moved following the priority order. For example, in the case where the movement axes are three orthogonal axes, i.e., X axis, Y axis, and Z axis, the movable structure is moved along the X axis, the Y axis, and the Z axis in this order.

3) In the case where there is a plurality of movement axes for moving the movable structure to be operated, the movable structure is moved so that movement distance becomes the shortest distance.

Further, in the machine tool of the present disclosure, the external input unit may further include an execution key for inputting an execution signal for executing the movement of the movable structure corresponding to the operation signal, the input control unit may be configured to transmit the operation signal and the execution signal input from the external input unit to the numerical control unit, and the numerical control unit may be configured to receive the operation signal and the execution signal and move the movable structure along the movement path corresponding to the operation signal.

According to this machine tool, when the execution key of the external input unit is pressed down and an execution signal is input from the external input unit, the input control unit transmits the execution signal, together with the operation signal, to the numerical control unit, and under control by the numerical control unit the corresponding movable structure is driven to move along the movement path corresponding to the operation signal.

According to this configuration, since the operator can actually move the movable structure to be operated by pressing the execution key after checking the actual positional relationship between the movable structure and other structures in addition to the movement path image displayed on the display unit and thereby confirming whether the movable structure can be moved safely, the movable structure can be moved more safely.

Further, in the machine tool of the present disclosure, the movement path setting unit may be configured to set a plurality of movement paths until the movable structure reaches the movement end point in accordance with a plurality of predetermined setting conditions, the display control unit may be configured to display an image relating to the plurality of movement paths set by the movement path setting unit on the display unit, the external input unit may include a selection key for inputting a selection signal for selecting one from among the plurality of movement paths displayed on the display unit, the input control unit may be configured to, when a selection signal is input from the external input unit, transmit position data relating to the selected movement path and an execution signal to the numerical control unit, and the numerical control unit may be configured to receive the position data relating to the movement path and the execution signal and move the movable structure along the movement path.

According to this machine tool, the movement path setting unit sets a plurality of movement paths for moving the movable structure, and an image relating to the set plurality of movement paths is displayed on the display unit by the display control unit. When the operator inputs an selection signal for selecting one from among the plurality of movement paths through the selection key, positon data relating to the selected movement path and an execution signal are transmitted to the numerical control unit, and the movable structure is moved along the movement path under control by the numerical control unit.

Thus, according to this machine tool, the operator can move the movable structure through a movement path which has been appropriately selected as necessary from among the displayed plurality of movement paths, for example, selecting a movement path attaching more importance to safety or selecting a movement path having a shorter movement distance.

It is noted that, as a mode attaching importance to a movement time, the machine tool may have a configuration in which the movement path setting unit sets at least a movement path having the shortest movement time.

Further, in the machine tool, the movement path setting unit may be configured to set, as the movement paths to be set, at least a single-axis movement path formed by connecting one or more paths which are each along a single movement axis, and the display control unit may be configured to display an image relating to the single-axis movement path and an image relating to the movement axes corresponding to the paths forming the single-axis movement path on the display unit when displaying the single-axis movement path.

According to this machine tool, since the image relating to the single-axis movement path and the image relating to the movement axes of the paths are displayed, by looking at the displayed images, the operator can easily recognize the order of movement axis directions in which the movable structure to be operated is moved.

Further, the machine tool may further comprise a model data storage unit storing therein at least model data relating to the movable structures, and the display control unit may be configured to generate an image of the movable structures based on the model data stored in the model data storage unit and display the generated image on the display unit, and generate an image of the movable structure moving in accordance with the movement path set by the movement path setting unit and display the generated image on the display unit. When thus configured, the operator can confirm a movement state of the movable structure by looking at the image of the movable structure moving along the set movement path.

Furthermore, the machine tool may further comprise a model data storage unit storing therein at least model data relating to the movable structures and model data relating to other structures having the possibility of interference with the movable structures within movable areas of the movable structures, and the movement path setting unit may be configured to perform a processing of reading out the model data stored in the model data storage unit and generating a virtual model in which models of the movable structures and the other structures are arranged in a virtual space to have a positional relationship before the movement of the movable structure, and then moving the model of the corresponding movable structure along the set movement path in the virtual space and thereby verifying whether a structure which interferes with the movable structure exists or not and, in the case where interference occurs, a processing of setting an avoidance path for avoiding the interference, and then changing the movement path so that the movable structure follows the set avoidance path.

According to this machine tool, the movement path setting unit sets a movement path and performs a processing of verifying whether a structure which interferes with the movable structure exists or not when the movable structure is moved along the set movement path. In the case where interference occurs, an avoidance path for avoiding the interference is set and the movement path is changed so that the movable structure follows the set avoidance path. Therefore, the movable structure to be operated can be moved safely through a movement path where no interference occurs.

Furthermore, the machine tool may further comprise a model data storage unit storing therein at least model data relating to the movable structures and model data relating to other structures having the possibility of interference with the movable structures within movement areas of the movable structures, and the movement path setting unit may be configured to read out the model data stored in the model data storage unit and generate a virtual model in which models of the movable structures and the other structures are arranged in a virtual space to have a positional relationship before the movement of the movable structure, and then move the model of the corresponding movable structure along each of the set movement paths within the virtual space and thereby verify whether a structure which interferes with the movable structure exists, and then select a movement path where no interference occurs, and the display control unit may be configured to display only an image relating to a movement path selected as a noninterference path by the movement path setting unit on the display unit.

According to this machine tool, since the movement path setting unit sets movement paths and verifies whether a structure which interferes with the movable structure when the movable structure is moved along each of the set movement paths exists, and then a movement path where no interference occurs is selected and only an image relating to the selected movement path where no interference occurs is displayed on the display unit, the movable structure to be operated can be moved safely through a movement path where no interference occurs.

Further, in the machine tool configured to verify whether interference occurs, the display control unit may be configured to generate an image of the movable structures based on the model data relating to the movable structures stored in the model data storage unit and display the generated image on the display unit, and generate an image of the movable structure to be operated moving in accordance with the movement path set by the movement path setting unit and display the generated image on the display unit. When thus configured, the operator can confirm a movement state of the movable structure by looking at the image of the movable structure moving along the movement path.

Further, the machine tool may have a configuration in which the display unit comprises a touch panel and the movement end point is specified by a position signal input from the touch panel. When thus configured, the operator can arbitrarily and easily set the movement end point of the movable structure to be operated.

As described in detail above, according to the machine tool of the present disclosure, after inputting an operation signal from the external input unit, the operator can easily recognize how the movable structure to be operated is operated by the operation by checking an image representing a movement path displayed on the display unit. Further, by checking the actual positional relationship between the movable structure and other structures by visual observation or the like in addition to the image relating to the movement path, the operator can confirm whether the movable structure to be operated can be moved safely. Further, in the configuration in which the movable structure is actually moved by pressing down the execution key, the movable structure can be moved more safely.

Further, in the configuration in which one movement path is selected from among a plurality of movement paths, the movable structure can be moved through a movement path which is appropriately selected as necessary.

Further, in the case where the movement path of the movable structure is a single-axis movement path, displaying an image relating to the single-axis movement path and an image relating to the movement axes of the paths thereof enables the operator to easily recognize the order of movement axis directions in which the movable structure to be operated is moved by looking at the displayed images.

Further, in the configuration in which it is verified whether interference occurs when the movable structure is moved along each of the set movement paths, and in the case where interference occurs, an avoidance path for avoiding the interference is set and the movement path is changed thereto or a movement path where no interference occurs is selected and only an image relating to the movement path where no interference occurs is displayed on the display unit, the movable structure to be operated can be moved safely through a movement path where no interference occurs.

Further, in the configuration in which an image of the movable structure moving along the set movement path is generated and the generated image is displayed on the display unit, the operator can confirm a movement state of the movable structure by looking at the image of the movable structure moving along the movement path.

Further, when the machine tool has a configuration in which the movement end point is specified by a position signal input from a touch panel, the operator can arbitrarily and easily set the movement end point of the movable structure to be operated.

BRIEF DESCRIPTION OF THE DRAWINGS

For a more complete understanding of the disclosed methods and apparatus, reference should be made to the embodiment illustrated in greater detail on the accompanying drawings, wherein.

It should be understood that the drawings are not necessarily to scale and that the disclosed embodiments are sometimes illustrated diagrammatically and in partial views. In certain instances, details which are not necessary for an understanding of the disclosed methods and apparatus or which render other details difficult to perceive may have been omitted. It should be understood, of course, that this disclosure is not limited to the particular embodiments illustrated herein.

DETAILED DESCRIPTION

A specific embodiment of the present disclosure will be described below with reference to the drawings.

Figure 1:
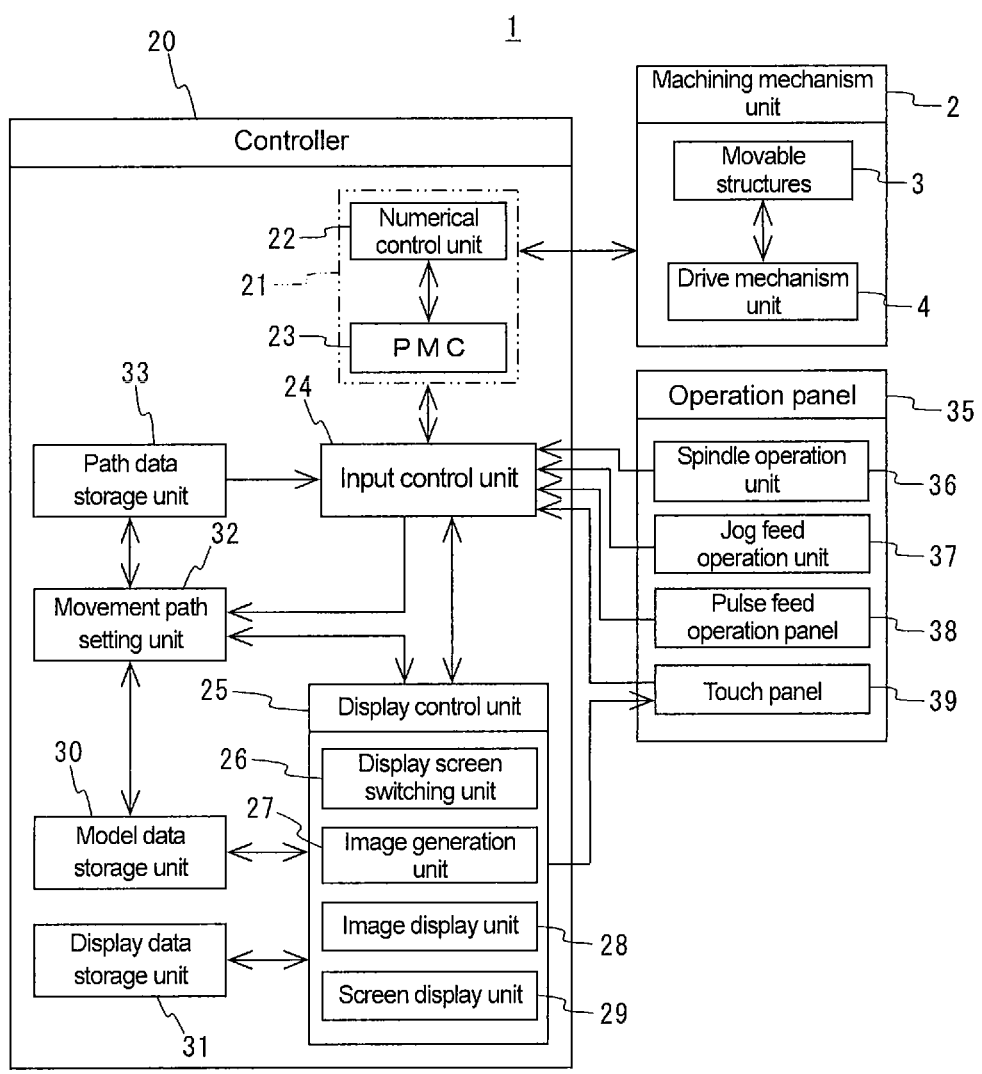
FIG. 1 is a block diagram illustrating a schematic configuration of a machine tool according to one embodiment of the present disclosure.

As illustrated in FIG. 1, a machine tool 1 of this embodiment includes a machining mechanism unit 2, a controller 20, and an operation panel 35. It is noted that FIGS. 2 to 6 are diagrams illustrating a display screen 40 of a touch panel 39, which will be described later, and the reference numerals in parentheses in the figures denote components of the machining mechanism unit 2.

The machining mechanism unit 2 includes a bed (not illustrated), and a first headstock 10, a second headstock 13, a first tool rest 16, and a second tool rest 18 illustrated in FIGS. 2 to 6, which are disposed on the bed (not illustrated). The first headstock 10 has a first spindle 11 and a first chuck 12 disposed on an axial end of the first spindle 11 and, on the other hand, the second headstock 13 has a second spindle 14 and a second chuck 15 disposed on an axial end of the second spindle 14. The first headstock 10 and the second headstock 13 are disposed coaxially along Z axis of three orthogonal axes: X axis, Y axis and Z axis, so that the first chuck 12 and the second chuck 15 are opposed mutually. Further, the first spindle 11 and the second spindle 14 are each driven by an appropriate drive motor to rotate about their respective axes.

The first tool rest 16 has a first turret 17 and is configured to be moved in the X-axis and Z-axis directions by an appropriate feed mechanism, and the first turret 17 is driven by an appropriate drive motor to rotate about its axis along the Z-axis direction. Further, the second tool rest 18 has a second turret 19 and is configured to be moved in the X-axis, Y-axis and Z-axis directions by an appropriate feed mechanism, and the second turret 19 is also driven by an appropriate drive motor to rotate about its axis along the Z-axis direction.

It is noted that, in this embodiment, the first tool rest 16, the first turret 17, the second tool rest 18, and the second turret 19 are movable structures 3, and the first headstock 10, the first spindle 11, the first chuck 12, the second headstock 13, the second spindle 14, and the second chuck 15 are structures other than the movable structures 3. Further, the drive motors driving the first spindle 11 and the second spindle 14, the feed mechanisms driving the first tool rest 16 and the second tool rest 18, and the drive motors driving the first turret 17 and the second turret 19 are included in a drive mechanism unit 4.

As illustrated in FIG. 1, the operation panel 35 includes a spindle operation unit 36, a jog feed operation unit 37, a pulse feed operation unit 38, and the touch panel 39.

The spindle operation unit 36 is an input unit for inputting signals for manually rotating the first spindle 11 and the second spindle 14 to a numerical control unit 22, which will be described later, via an input control unit 24, which is also described later, and includes, for example, selection keys for selecting a rotation target from the first spindle 11 and the second spindle 14 and driving keys for rotating the rotation target in a predetermined direction: a normal direction or a reverse direction.

The jog feed operation unit 37 is an input unit for inputting signals for moving the first tool rest 16 and the second tool rest 18 by jog feed to the numerical control unit 22 via the input control unit 24, and includes, in this embodiment, selection keys for selecting a movement target from the first tool rest 16 and the second tool rest 18 and six keys for inputting a signal relating to jog feed directions: X-axis +, X-axis −, Y-axis +, Y-axis −, Z-axis + and Z-axis − and a jog feed signal.

The pulse feed operation unit 38 is an input unit for inputting signals for moving the first tool rest 16 and the second tool rest 18 by pulse feed to the numerical control unit 22 via the input control unit 24, and includes a pulse handle for generating a pulse signal and keys for selecting one from feed axes, i.e., the X axis, the Y axis, and the Z axis. Further, as for selection keys for selecting a movement target, the selection keys of the jog feed operation unit 37 are used also in the pulse feed operation unit 38.

The touch panel 39 functions as a display and an external input unit, and has a predetermined display area 40. When an operator touches the inside of the display area 40, the touch panel 39 performs a processing of transmitting a signal relating to the touched position as an input signal to the input control unit 24.

It is noted that the keys, switches and pulse handle, etc. for manual operations, which are provided on the operation panel 35, have configurations well known in the field of machine tools, and their configurations are not limited to the above-described ones also in this embodiment.

As illustrated in FIG. 1, the controller 20 includes a control unit 21 having the numerical control unit 22 and a programmable machine controller (PMC) 23, the input control unit 24, a display control unit 25, a model data storage unit 30, a display data storage unit 31, a movement path setting unit 32, and a path data storage unit 33, as shown in FIG. 1.

The numerical control unit 22 controls the rotations of the first spindle 11 and the second spindle 14 in accordance with an NC program and numerically controls the movements of the first tool rest 16 and the second tool rest 18. The PMC 23 controls operations of the first chuck 12, the second chuck 15, the first turret 17, and the second turret 19 in accordance with a predetermined operation program. Further, besides the control based on the programs, the numerical control unit 22 and the PMC 23 receive a manual operation signal input from the operation panel 35 via the input control unit 24 and control the rotations of the first spindle 11 and the second spindle 14, the movements of the first tool rest 16 and the second tool rest 18, and the operations of the first chuck 12, the second chuck 15, the first turret 17, and the second turret 19 in accordance with the received manual operation signal.

The input control unit 24 is a processing unit processing the signals input from the operation panel 35 and performs a processing of transmitting the signals input from the spindle operation unit 36, the jog feed operation unit 37, and the pulse feed operation unit 38 to the numerical control unit 22, as described above.

Further, the input control unit 24 performs a processing of receiving the position signal input from the touch panel 39, referring to data obtained from the display control unit 25, and transmitting a command signal corresponding to the input position signal to the numerical control unit 22, the movement path setting unit 32, and the display control unit 25 as necessary.

For example, on the screens illustrated in FIGS. 2 to 6, an image display area 41 and a softkey display area 42 are set within the display area 40, and a "first tool rest" key 43, a "second tool rest" key 44, a "zero return" key 45, an "X-axis zero point" key 46, a "Y-axis zero point" key 47, a "Z-axis zero point" key 48, a "movement position designation" key 49, a "route A selection" key 50, a "route B selection" key 51, a "route C selection" key 52, and an "execution" key 53 are displayed as softkeys in the softkey display area 42. It is noted that the screens illustrated in FIGS. 2 to 6 are operation screens for alternatively returning either one of the first tool rest 16 and the second tool rest 18 to a zero point or moving either one of the first tool rest 16 and the second tool rest 18 to a designated position.

In this embodiment, when the operator presses down the "first tool rest" key 43 or the "second tool rest" key 44, a position signal thereof is input to the input control unit 24. The input control unit 24 performs a processing of referring to data obtained from the display control unit 25 (more specifically, a screen display unit 29, which will be described later), recognizing which of the first tool rest 16 and the second tool rest 18 is selected by this position signal, and transmitting a signal relating to the selected tool rest to the numerical control unit 22, the movement path setting unit 32, and the display control unit 25 (more specifically, the screen display unit 29).

Similarly, when the "zero return" key 45, the "X-axis zero point" key 46, the "Y-axis zero point" key 47, or the "Z-axis zero point" key 48 is pressed down, the input control unit 24 transmits a "zero return signal", an "X-axis zero return signal", a "Y-axis zero return signal", or a "Z-axis zero return signal" corresponding to the pressed-down key to the numerical control unit 22, the movement path setting unit 32, and the screen display unit 29. Further, when the "execution" key 53 is pressed down, the input control unit 24 transmits an "execution command" to the numerical control unit 22 and the screen display unit 29. It is noted that position data relating to the X-axis zero position, the Y-axis zero position and the Z-axis zero position are stored as parameters in the numerical control unit 22.

Further, when the "route A selection" key 50, the "route B selection" key 51, or the "route C selection" key 52 is pressed down, the input control unit 24 recognizes the pressed-down key as a "route A selection signal", a "route B selection signal", or a "route C selection signal" and reads out position data relating to a corresponding route from the path data storage unit 33, and performs a processing of transmitting the position data and an "execution signal" to the numerical control unit 22 and transmitting the recognized route selection signal to the screen display unit 29.

Furthermore, when the "movement position designation" key 49 is pressed down, the input control unit 24 recognizes the pressed-down key as a "movement position designation signal", and when a position signal is additionally input from the image display area 41 of the touch panel 39, performs a processing of transmitting the position signal and the "movement position designation signal" to the movement path setting unit 32 and transmitting the "movement position designation signal" to the screen display unit 29.

The model data storage unit 30 is a functional unit storing therein data relating to three-dimensional models of the movable structures 3 of the processing mechanism unit 2 and other structures having the possibility of interference with the movable structures 3 within movable areas of the movable structures 3. In this embodiment, three-dimensional model data relating to the first headstock 10, the first spindle 11, the first chuck 12, the second headstock 13, the second spindle 14, the second chuck 15, the first tool rest 16, the first turret 17, the second tool rest 18, and the second turret 19 are previously stored in the model data storage unit 30.

The display data storage unit 31 is a functional unit storing therein data relating to screens displayed in the display area 40 of the touch panel 39 and data for displaying tables and softkeys in the screens, and these data are previously stored therein as appropriate. It is noted that, as for the data relating to the display screens, an image display screen for displaying a model image of the structures of the machining mechanism unit 2, a softkey display screen for displaying softkeys, a screen for displaying an NC program, a screen for displaying the numbers of rotation of the first spindle 11 and the second spindle 14 (spindle rotation number display screen), and a screen for displaying current positions of the first tool rest 16 and the second tool rest 18 (movable body current position display screen) are given as examples, and various conventionally known display screens are included.

The path data storage unit 33 is a functional unit storing therein data relating to a movement path which is set by the movement path setting unit 32.

As illustrated in FIG. 1, The display control unit 25 includes a display screen switching unit 26, an image generation unit 27, an image display unit 28, and the screen display unit 29.

The image generation unit 27 reads out the three-dimensional mode data stored in the model data storage unit 30 and generates a three-dimensional model in which three-dimensional models of the structures are arranged in an appropriate three-dimensional space (i.e., a virtual three-dimensional space having the same coordinate axes as those of a three-dimensional space set in the numerical control unit 22). In this embodiment, a three-dimensional model image is generated in which three-dimensional models of the structures other than the movable structures 3, i.e., three-dimensional models of the first headstock 10, the first spindle 11, the first chuck 12, the second headstock 13, the second spindle 14, and the second chuck 15 are arranged in the three-dimensional space to have the same arrangement as the actual arrangement and, based on position signals relating to the first tool rest 16 and the second tool rest 18 received from the numerical control unit 22, the first tool rest 16, the first turret 17, the second tool rest 18, and the second turret 19 as the movable structures 3 are arranged in the three-dimensional space to have a received positional relationship.

It is noted that, in the case where the first tool rest 16 or the second tool rest 18, which are the movable structures 3, is moved under the control by the numerical control unit 22 by a manual operation signal (a jog feed signal or a pulse feed signal) input from the jog feed operation unit 37 or the pulse feed operation unit 38 of the operation panel 35 or by an automatic operation, the image generation unit 27 receives position signals thereof from the numerical control unit 22 at predetermined time intervals and sequentially generates a three-dimensional model image in which the first tool rest 16, the first turret 17, the second tool rest 18, and the second turret 19 are arranged to have a received positional relationship.

Further, in the case where a movement path is set by the movement path setting unit 32, the image generation unit 27 receives information including position data relating to the set movement path from the movement path setting unit 32 and generates an image representing the movement path.

The display screen switching unit 26 is a processing unit setting a screen to be displayed in the display area 40 of the touch panel 39 with reference to the data stored in the display data storage unit 31 and is configured to be able to, besides the image display screen 41 and the softkey display screen 42 illustrated in FIGS. 2 to 6, selectively set one of the NC program display screen, the spindle rotation number display screen, the movable body current position display screen and the like as appropriate or set a screen in which these screens are selectively combined. It is noted that switching of the display screen can be performed by softkeys displayed on the touch panel 39 and the display screen switching unit 26 switches the display screen to a display screen selected by the softkeys, for example.

The screen display unit 29 is a processing unit displaying, in areas other than the image display area 41, screens to be displayed there out of the display screens set by the display screen switching unit 26, and the screen display unit 29 performs a processing of displaying softkeys in a predetermined display area and a processing of receiving data relating to an NC program from the numerical control unit 22 and displaying the NC program, and further performs a processing of receiving data relating to the numbers of rotation of the first spindle 11 and the second spindle 14 from the numerical control unit 22 and displaying the numbers of rotation and a processing of receiving data relating to current positions of the first tool rest 16 and the second tool rest 11 from the numerical control unit 22 and displaying the current positions, for example. Further, when a signal indicating that a softkey is pressed down (a command signal corresponding to the pressed-down softkey) is input from the input control unit 24, the screen display unit 29 performs a processing of reversing the black and white of the display of the corresponding softkey.

The image display unit 28 performs a processing of displaying the three-dimensional model image generated by the image generation unit 27 and an image relating to the movement path in the image display area 41 of the touch panel 39. It is noted that, in FIGS. 2 to 6, the reference 60 denotes an image of the first headstock 10, the reference 61 denotes an image of the first spindle 11, the reference 62 denotes an image of the first chuck 12, the reference 63 denotes an image of the second headstock 13, the reference 64 denotes an image of the second spindle 14, and the reference 65 denotes an image of the second chuck 15. Further, the reference 66 denotes an image of the first tool rest 16, the reference 67 denotes an image of the first turret 17, the reference 68 denotes an image of the second tool rest 18, and the reference 69 denotes an image of the second turret 19. In FIGS. 2 to 6, each of the references and the lead thereof do not form the image.

The movement path setting unit 32 performs, when receiving a signal for selecting the first tool rest 16 or the second tool rest 18, and a "zero return signal", an "X-axis zero return signal", a "Y-axis zero return signal", a "Z-axis zero return signal", or a "movement position designation signal" with a position signal from the input control unit 24, a processing that corresponds to the received signal and is any one of a) zero return path setting processing, b) X-axis zero return path setting processing, c) Y-axis zero return path setting processing, d) Z-axis zero return path setting processing, and e) designated point movement path setting processing, which are described below.

a) Zero Return Path Setting Processing

This processing is a processing to be performed when a "zero return signal" is received from the input control unit 24. In this processing, in accordance with a signal for selecting the first tool rest 16 or the second tool rest 18 which is similarly input from the input control unit 24, for the selected tool rest, a plurality of paths for returning the selected tool rest to a machine zero point are set.

Specifically, the movement path setting unit 32 first receives position data relating to the machine zero point, which is previously set, and position data relating to the current position of the selected tool rest from the numerical control unit 22 and sets a plurality of movement paths for moving the selected tool rest from the current position to the machine zero point in accordance with setting conditions, which are also previously set. It is noted that, although the following conditions can be given as examples of the setting conditions, the setting conditions are not limited thereto:

1) shortest distance route;
2) same speed movement for each axis;
3) axis priority order: X axis→Y axis→Z axis;
4) axis priority order: X axis→Z axis→Y axis;
5) axis priority order: Y axis→X axis→Z axis;
6) axis priority order: Y axis→Z axis→X axis;
7) axis priority order: Z axis→X axis→Y axis; and
8) axis priority order: Z axis→Y axis→X axis.

Next, the movement path setting unit 32 verifies whether interference occurs for each of the set movement paths, and, in the case where interference occurs, the movement path setting unit 32 sets a path for avoiding the interference. Specifically, the movement path setting unit 32 first reads out the three-dimensional model data stored in the model data storage unit 30 and receives position signals relating to the first tool rest 16 and the second tool rest 18 from the numerical control unit 22, and generates a three-dimensional model in which the three-dimensional models of the structures other than the movable structures 3, i.e., the three-dimensional models of the first headstock 10, the first spindle 11, the first chuck 12, the second headstock 13, the second spindle 14, and the second chuck 15 are arranged in a three-dimensional space to have the same arrangement as the actual arrangement and the first tool rest 16, the first turret 17, the second tool rest 18, and the second turret 19 as the movable structures 3 are arranged in the three-dimensional space to have a received positional relationship. It is noted that this three-dimensional space is the same as the virtual three-dimensional space in the image generation unit 27.

Next, the three-dimensional models of the selected tool rest and the structures accompanying with the selected tool are moved along each of the set movement paths for simulation as to whether interference occurs, and only movement paths where no interference occurs are selected as movable paths, and information relating to the selected movement paths is transmitted to the image generation unit 27 and the information is stored in the path data storage unit 33. It is noted that the movement path information includes information relating to a route name of each of the movement paths, i.e., in the example shown in FIG. 2, distinction among "route A", "route B", and "route C", and position data relating to a start point and an end point of a motion vector in each of the movement paths, i.e., in the example shown in FIG. 2, position data relating to positions $P_1$, $P_3$, $P_4$, and $P_2$ of the route A, position data relating to positions $P_1$, $P_5$, $P_6$, and $P_2$ of the route B, and position data relating to positions $P_1$ and $P_2$ of the route C.

b) X-Axis Zero Return Path Setting Processing

This processing is a processing to be performed when an "X-axis zero return signal" is received from the input control unit 24. In this processing, a path for returning the selected tool rest to a machine zero point set for the X axis is set. Specifically, the movement path setting unit 32 receives position data relating to the machine zero point set for the X axis and position data relating to the current position of the selected tool rest from the numerical control unit 22, sets a movement path for moving the selected tool rest from the current position to the X-axis machine zero point based on the received position data, and transmits information on the set movement path to the image generation unit 27. It is noted that, in FIG. 3, the position of the machine zero point set for the X axis is $P_{2X}$.

c) Y-Axis Zero Return Path Setting Processing

This processing is a processing to be performed when a "Y-axis zero return signal" is received from the input control unit 24. In this processing, a path for returning the selected tool rest to a machine zero point set for the Y axis is set. Specifically, the movement path setting unit 32 receives position data relating to the machine zero point set for the Y axis and position data relating to the current position of the selected tool rest from the numerical control unit 22, sets a movement path for moving the selected tool rest from the current position to the Y-axis machine zero point based on the received position data, and transmits information on the set movement path to the image generation unit 27. It is noted that, in FIG. 4, the position of the machine zero point set for the Y-axis is $P_{2Y}$.

d) Z-Axis Zero Return Path Setting Processing

This processing is a processing to be performed when a "Z-axis zero return signal" is received from the input control unit 24. In this processing, a path for returning the selected tool rest to a machine zero point set for the Z axis is set. Specifically, the movement path setting unit 32 receives position data relating to the machine zero point set for the Z axis and position data relating to the current position of the selected tool rest from the numerical control unit 22, sets a movement path for moving the selected tool rest from the current position to the Z-axis machine zero point based on the received position data, and transmits information on the set movement path to the image generation unit 27. It is noted that, in FIG. 5, the position of the machine zero point set for the Z-axis is $P_{2Z}$.

e) Designated Point Movement Path Setting Processing

This processing is a processing to be performed when a "movement position designation signal" and a position signal of a designated positon are received from the input control unit 24. In this processing, movement path information in which a plurality of paths for moving the selected tool rest to the designated position are set is transmitted to the image generation unit 27 and is stored in the path data storage unit 33. It is noted that the method of setting the movement paths is similar to that in the above-mentioned "zero return path setting processing". Further, in FIG. 6, P2' is the designated position, the route A is $P_1 \rightarrow P_3' \rightarrow P_4' \rightarrow P_2'$, the route B is $P_1 \rightarrow P_5' \rightarrow P_6' \rightarrow P_2'$, and the route C is $P_1 \rightarrow P_2$.

According to the machine tool 1 of this embodiment having the above-described configuration, screens set by the display screen switching unit 26 are displayed on the touch panel 39 of the operation panel 35. For the portions other than the image display area 41 within the display area 40, the screen display unit 29 displays screens as appropriate. For the image display area 41, the image display unit 28 displays images generated by the image generation unit 27. An operator can perform the following operations by pressing down softkeys displayed in the softkey display area 42.

a) Zero Return Operation

Figure 2:
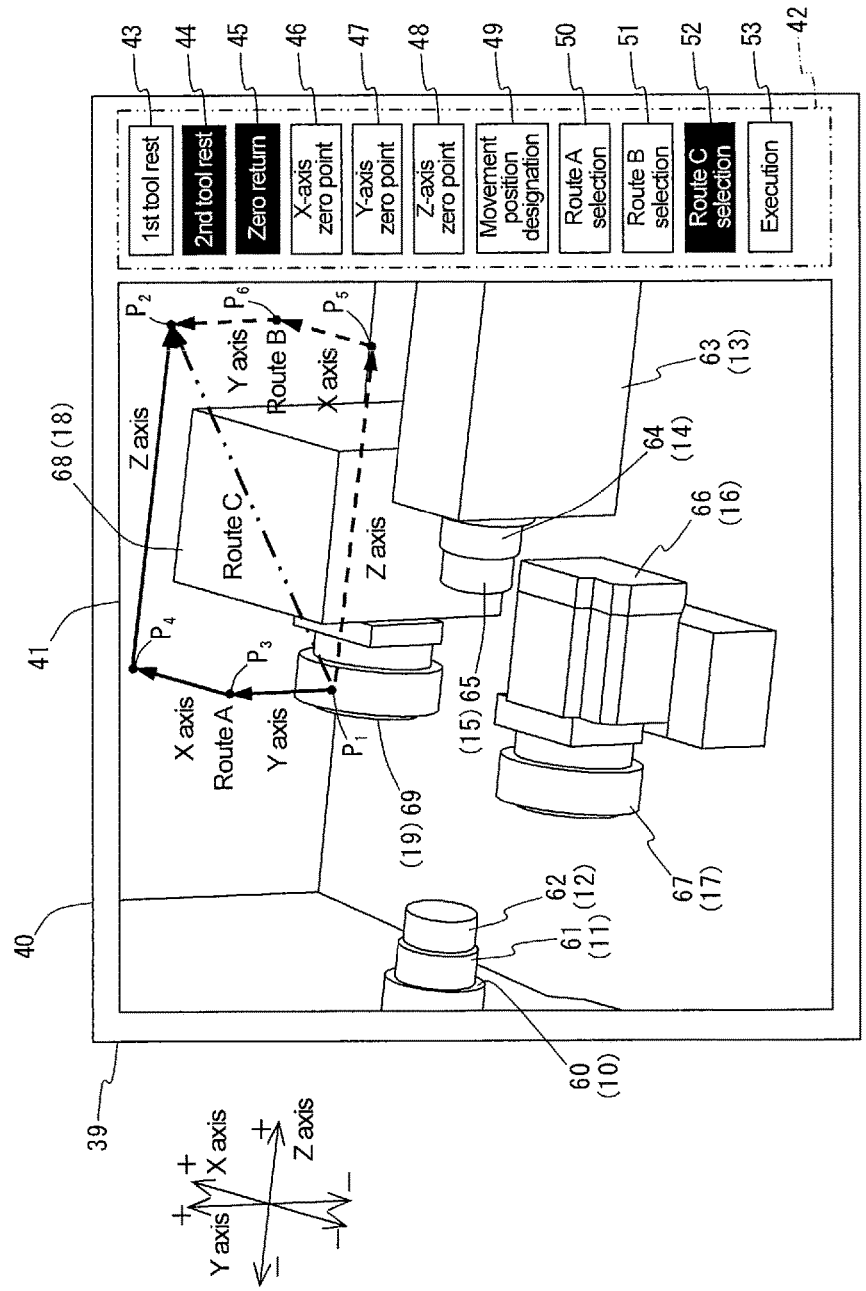
FIG. 2 is a diagram illustrating a display screen displayed on a touch panel according to the embodiment.

A zero return operation is executed by an operation as illustrated in FIG. 2. That is, first, when the operator presses down the "second tool rest" key 44 to move the second tool rest 18 as an operation target as illustrated in FIG. 2, a position signal thereof is transmitted to the input control unit 24. The input control unit 24 recognizes that the position signal is a signal for selecting the second tool rest 18, and then transmits the selection signal to the movement path setting unit 32 and the screen display unit 29. The screen display unit 29 receives the selection signal, and reverses the black and white of the image of the "second tool rest" key 44 displayed in the softkey display area 42.

Next, when the operator presses down the "zero return" key 45, a position signal thereof is transmitted to the input control unit 24. The input control unit 24 recognizes that the position signal is a "zero return signal", and then transmits the "zero return signal" to the movement path setting unit 32 and the screen display unit 29. The screen display unit 29 receives the "zero return signal", and reverses the black and white of the image of the "zero return" key 45 displayed in the softkey display area 42.

On the other hand, the movement path setting unit 32 receives the "zero return signal" from the input control unit 24 and then sets a plurality of paths for returning the selected tool rest to the machine zero point by executing the zero return path setting processing, and transmits information on the set movement paths to the image generation unit 27.

The image generation unit 27 generates an image representing the movement paths and character information relating to their route names and movement axes based on the movement path information received from the movement path setting unit 32. By the processing of the image display unit 28, the generated movement path image and character information are displayed in such a manner that they are superimposed on a model image already displayed in the image display area 41. It is noted that, although, in FIG. 2, three movement paths: route A, route B, and route C, are displayed, this is for convenience of explanation and the number of routes is set to three so that differences among the routes are easily understood. This is not intended to limit the present disclosure thereto and, as matter of course, all the movement paths set in the movement path setting unit 32 can be displayed.

Subsequently, for example, when the operator presses down the "route C selection" key 52 to select the route C as illustrated in FIG. 2, the position signal thereof is transmitted to the input control unit 24. The input control unit 24 recognizes that the position signal is a "route C selection signal", and then transmits the "route C selection signal" to the screen display unit 29 and reads out position data relating to the route C from the path data stored in the path data storage unit 33 and transmits the position data and an "execution signal" to the numerical control unit 22. The screen display unit 29 receives the "route C selection signal" and reverses the black and white of the image of the "route C selection" key 52 displayed in the softkey display area 42. On the other hand, the numerical control unit 22, upon receipt of the position data and the "execution signal", moves the selected tool rest (the first tool rest 16 or the second tool rest 18) to a received position.

b) X-Axis Zero Return Operation

Figure 3:
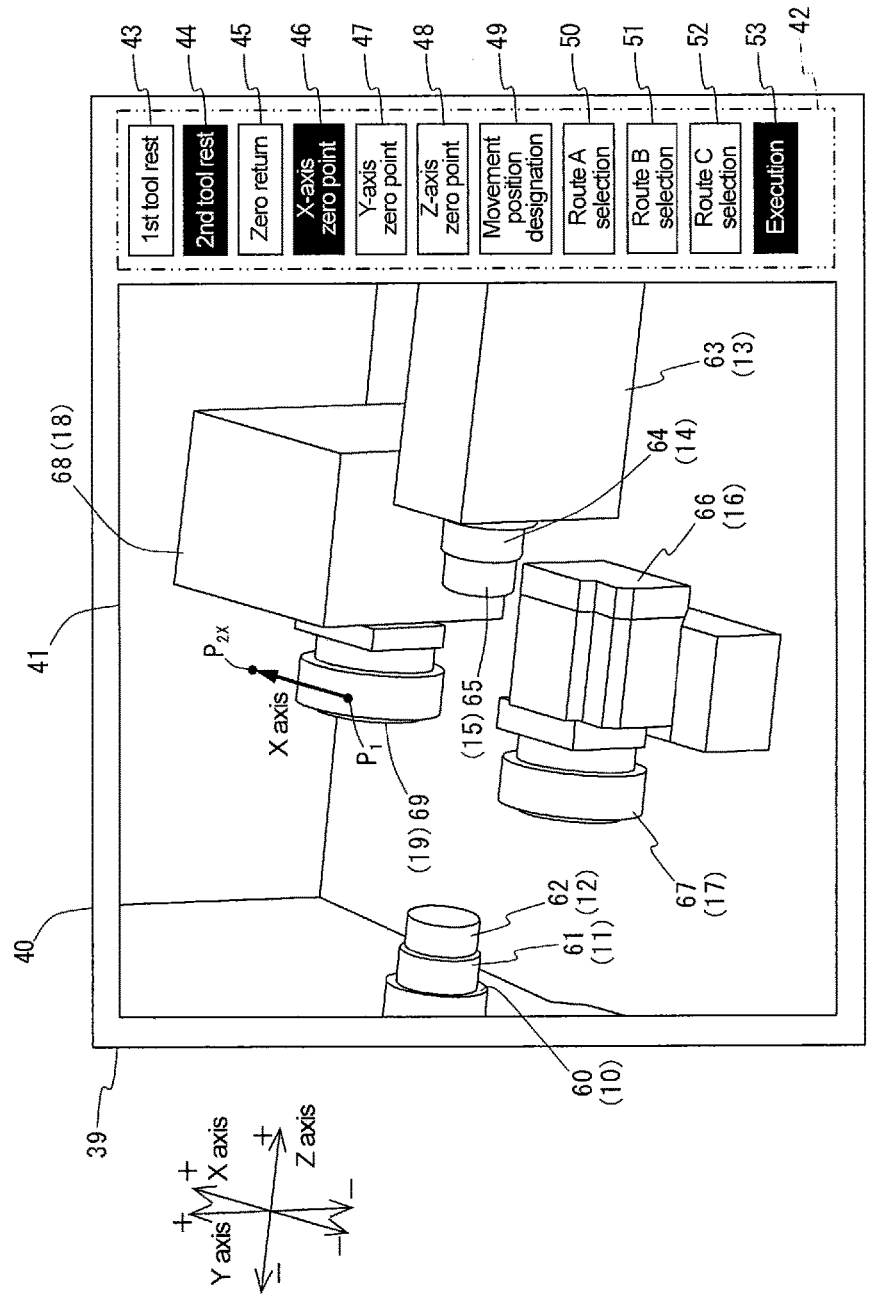
FIG. 3 is a diagram illustrating a display screen displayed on the touch panel according to the embodiment.

An X-axis zero return operation is executed by an operation as illustrated in FIG. 3. That is, for example, first, when the operator presses down the "second tool rest" key 44 to move the second tool rest 18 as an operation target, a selection signal is transmitted to the movement path setting unit 32 and the screen display unit 29 via the input control unit 24 in the same manner as described above. The screen display unit 29 receives the selection signal and reverses the black and white of the image of the "second tool rest" key 44 displayed in the softkey display area 42.

Next, when the operator presses down the "X-axis zero point" key 46, a position signal thereof is transmitted to the input control unit 24. The input control unit 24 recognizes that the position signal is an "X-axis zero return signal", and then transmits the "X-axis zero return signal" to the movement path setting unit 32 and the screen display unit 29. The screen display unit 29 receives the "X-axis zero return signal" and reverses the black and white of the image of the "X-axis zero point" key 46 displayed in the softkey display area 42.

On the other hand, the movement path setting unit 32 receives the "X-axis zero return signal" from the input control unit 24 and then receives position data relating to the machine zero point set for the X axis and position data relating to the current position of the selected tool rest from the numerical control unit 22, sets a movement path for moving the selected tool rest from the current position to the X-axis machine zero point based on the received position data, and transmits information on the set movement path to the image generation unit 27.

Then, the image generation unit 27 generates an image representing the movement path and character information relating to its movement axis based on the movement path information received from the movement path setting unit 32. By the processing of the image display unit 28, the generated movement path image and character information are displayed in such a manner that they are superimposed on a model image already displayed in the image display area 41.

Subsequently, when the operator then presses down the "execution" key 53, a position signal thereof is transmitted to the input control unit 24. The input control unit 24 recognizes that the position signal is an "execution signal", and then transmits the "execution signal" to the numerical control unit 22 and the screen display unit 29. The screen display unit 29 receives the "execution signal" and reverses the black and white of the image of the "execution" key 53 displayed in the softkey display area 42. On the other hand, the numerical control unit 22, upon receipt of the "execution signal", moves the selected tool rest to the X-axis zero point.

c) Y-Axis Zero Return Operation

Figure 4:
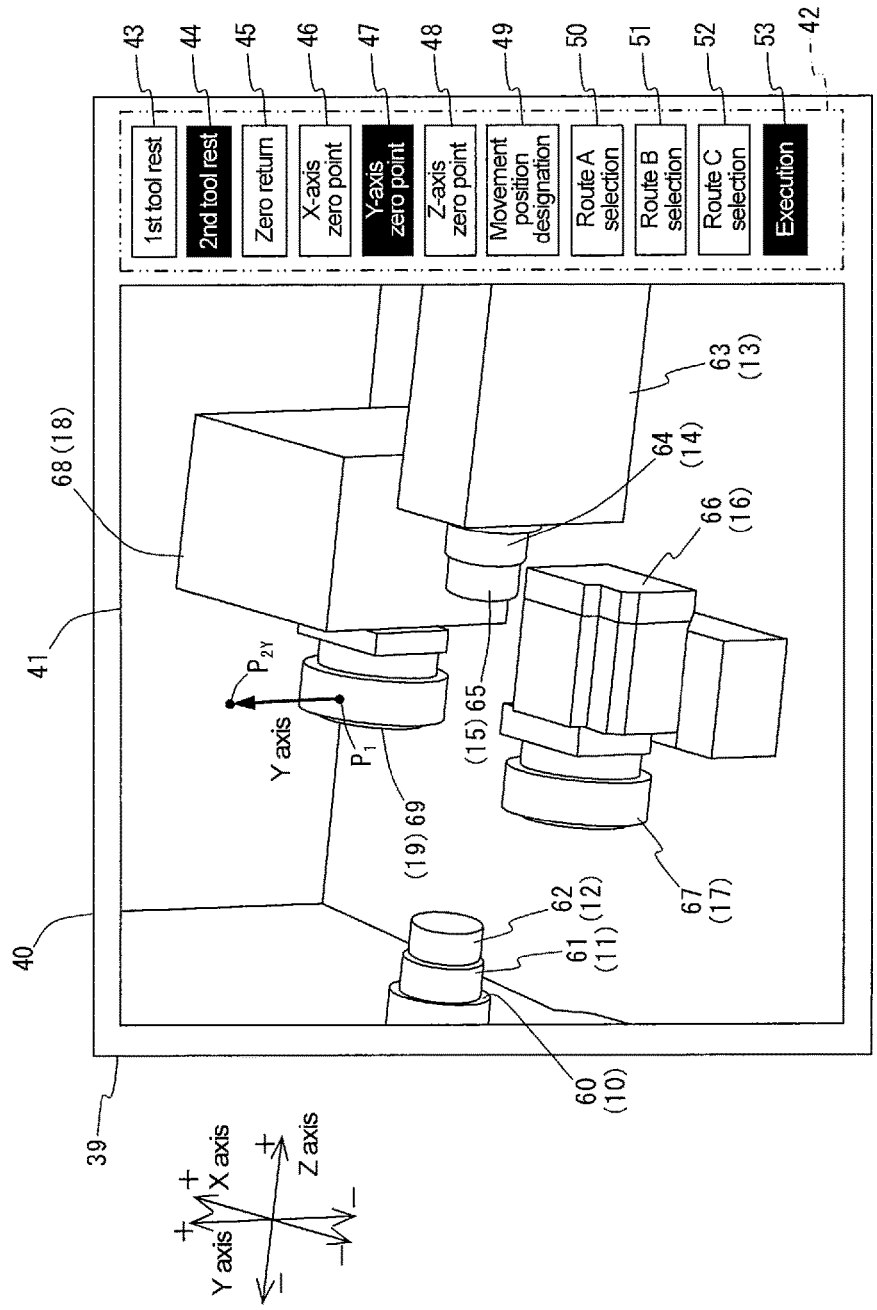
FIG. 4 is a diagram illustrating a display screen displayed on the touch panel according to the embodiment.

A Y-axis zero return operation is executed by an operation as illustrated in FIG. 4. It is noted that, because the Y-axis zero return operation is substantially similar to the above-described X-axis zero return operation, only an outline thereof is described. In the Y-axis zero return operation, when the operator presses down, for example, the "second tool rest" key 44 to select the second tool rest 18 as a tool rest to be operated and presses down the "Y-axis zero point" key 47 to return the second tool rest 18 to the Y-axis zero point, an image representing a movement path therefor and character information relating to a movement axis of the movement path are displayed in the image display area 41 of the touch panel 39. Subsequently, when the operator presses down the "execution" key 53, the second tool rest 18 is moved to the Y-axis zero point under control by the numerical control unit 22.

d) Z-Axis Zero Return Operation

Figure 5:
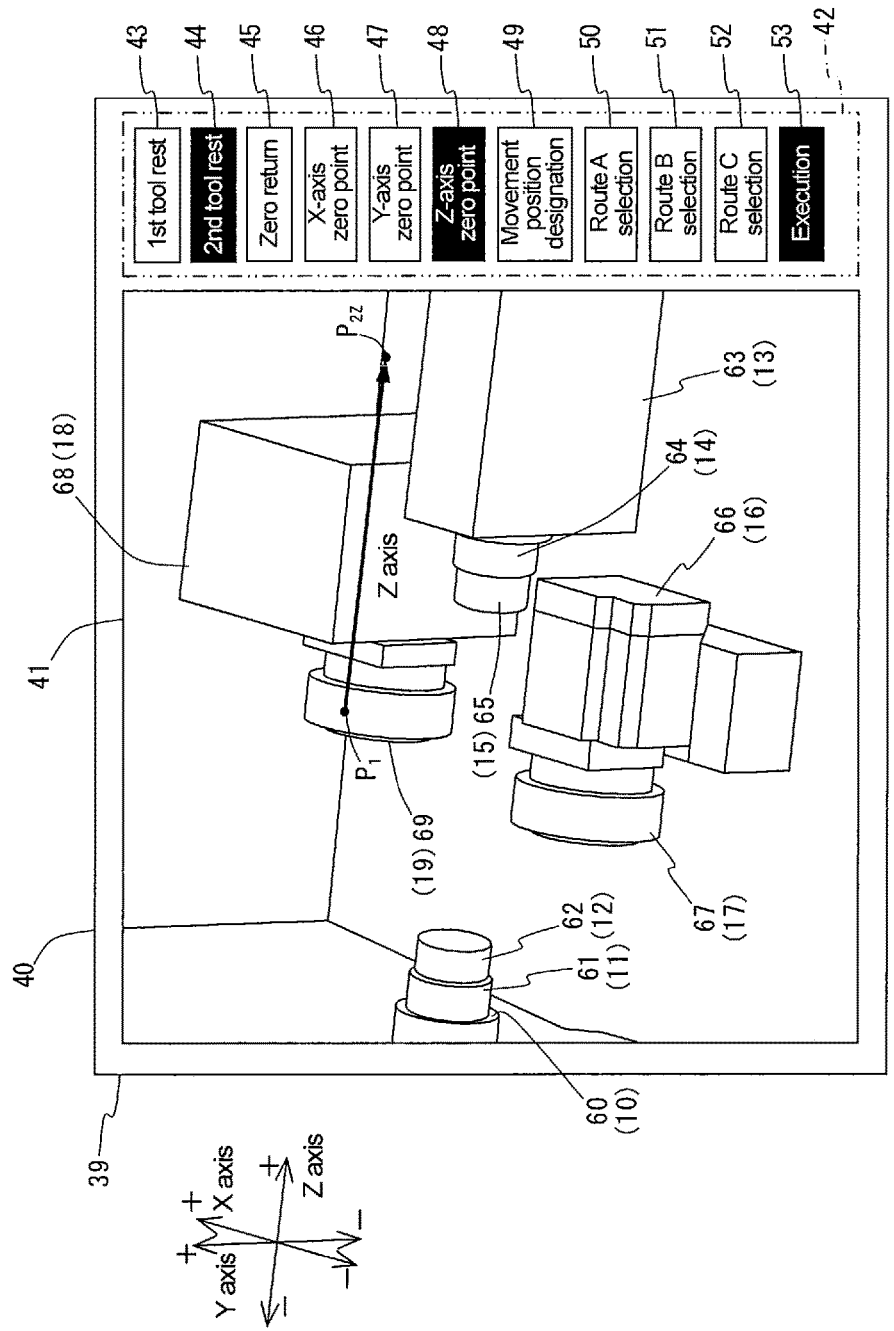
FIG. 5 is a diagram illustrating a display screen displayed on the touch panel according to the embodiment.

A Z-axis zero return operation is executed by an operation as illustrated in FIG. 5. It is noted that, because the Z-axis zero return operation is also substantially similar to the above-described X-axis zero return operation, only an outline thereof is described. In the Z-axis zero return operation, when the operator presses down, for example, the "second tool rest" key 44 to select the second tool rest 18 as a tool rest to be operated and presses down the "Z-axis zero point" key 48 to return the second tool rest 18 to the Z-axis zero point, an image representing a movement path therefor and character information relating to a movement axis of the movement path are displayed in the image display area 41 of the touch panel 39. Subsequently, when the operator presses down the "execution" key 53, the second tool rest 18 is moved to the Z-axis zero point under control by the numerical control unit 22.

e) Designated Point Movement Operation

Figure 6:
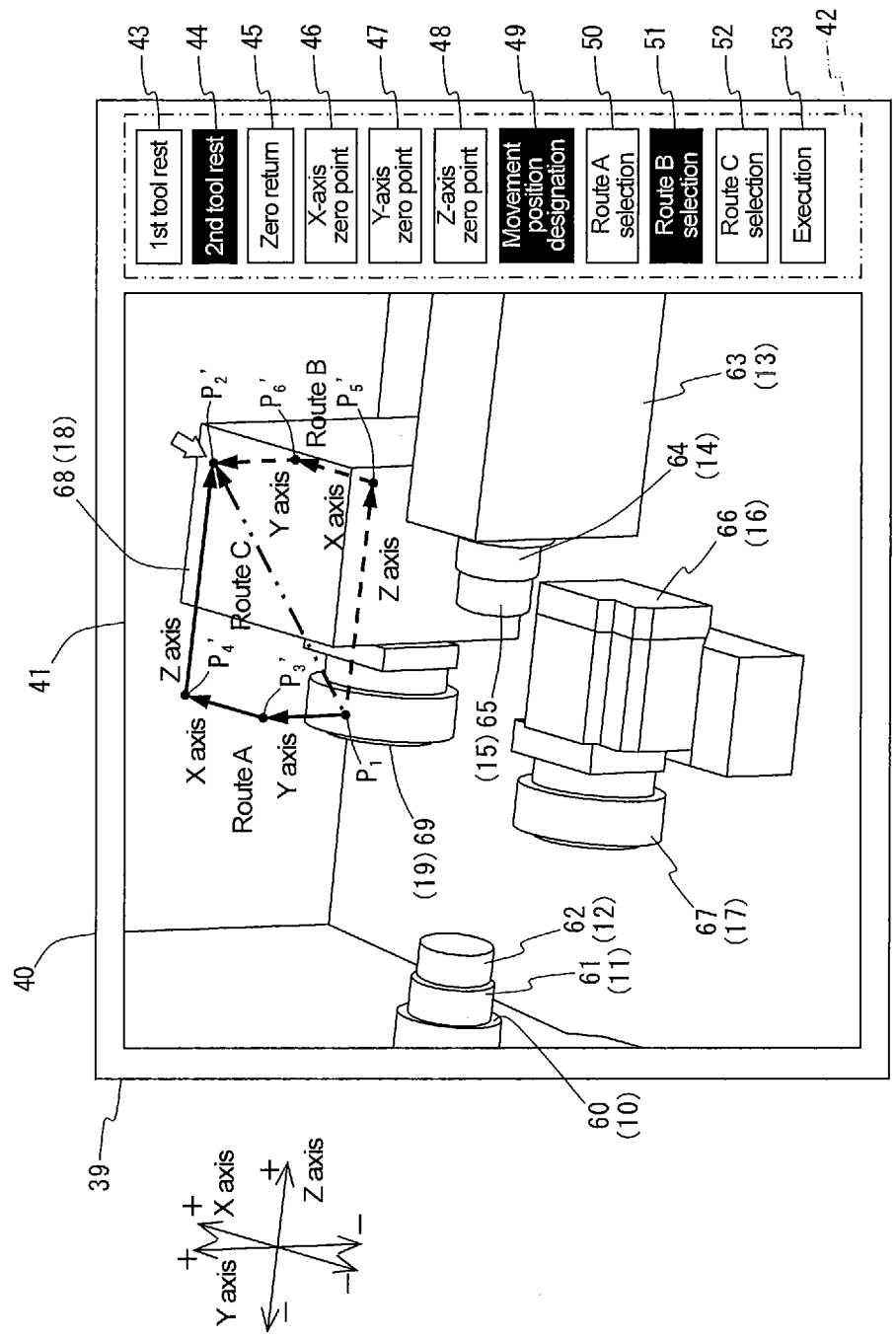
FIG. 6 is a diagram illustrating a display screen displayed on the touch panel according to the embodiment.

A designated point movement operation is executed by an operation as illustrated in FIG. 6. First, in the same manner as described above, when the operator presses down, for example, the "second tool rest" key 44 to move the second tool rest 18 as an operation target, a signal for selecting a tool rest is transmitted to the movement path setting unit 32 and the screen display unit 29 via the input control unit 24, and the screen display unit 29 receives this selection signal and reverses the black and white of the image of the "second tool rest" key 44 displayed in the softkey display area 42.

Next, when the operator presses down the "movement position designation" key 49, a position signal thereof is transmitted to the input control unit 24. The input control unit 24 recognizes that the position signal is a "movement position designation signal", and then transmits the "movement position designation signal" to the movement path setting unit 32 and the screen display unit 29. The screen display unit 29 receives the "movement position designation signal" and reverses the black and white of the image of the "movement position designation" key 49 displayed in the softkey display area 42.

Subsequently, when the operator presses an arbitrary position of the image display area 41 of the touch panel 39, a position signal thereof is input to the movement path setting unit 32 via the input control unit 24. It is noted that the image generation unit 27 is configured to generate at least two three-dimensional model images which differ in viewpoint (preferably, the viewpoints are perpendicular to each other) and the screen display unit 29 is configured to simultaneously or almost simultaneously display the two three-dimensional model images generated by the image generation unit 27 on the image display area 41 of the touch panel 39. Then, by pressing down a desired position on each of the two three-dimensional model images, the operator designates a position. Thereafter, based on setting data in the image generation unit 27, the movement path setting unit 32 recognizes what position within the three-dimensional space set by the image generation unit 27 the position specified by the at least two position signals input thereto corresponds to. The movement path setting unit 32 then sets a plurality of paths for moving the selected tool rest to the recognized designated position in the same manner as that in the "zero return path setting processing", and transmits information on the set movement paths to the image generation unit 27 and stores the information in the path data storage unit 33.

The image generation unit 27 generates an image representing the movement paths and character information relating to their route names and movement axes based on the movement path information received from the movement path setting unit 32. By the processing of the image display unit 28, the generated movement path image and character information are displayed in such a manner that they are superimposed on the model image already displayed in the image display area 41. It is noted that, in FIG. 6, the point indicated by a white arrow is the designated position.

Subsequently, when the operator presses down, for example, the "route B selection" key 51 to select the route B as illustrated in FIG. 6, a position signal thereof is transmitted to the input control unit 24. The input control unit 24 recognizes that the position signal is a "route B selection signal", and then transmits the "route B selection signal" to the screen display unit 29 and reads out position data relating to the route B from the path data stored in the path data storage unit 33 and transmits the position data and an "execution signal" to the numerical control unit 22. The screen display unit 29 receives the "route B selection signal" and reverses the black and white of the image of the "route B selection" key 52 displayed in the softkey display area 42. On the other hand, the numerical control unit 22, upon receipt of the position data and the "execution signal", moves the selected tool rest to a received position.

As described in detail above, according to the machine tool 1 of this embodiment, when returning a selected tool rest to a machine zero point or moving it to an arbitrary designated point, an image relating to a movement path therefor is displayed in the image display area 41 of the touch panel 39 in such a manner that it is superimposed on a model image of the structures, and therefore the operator can easily recognize how the selected tool rest is operated by the operation by checking the movement path image. Further, by checking a positional relationship of the selected tool rest and the other structures by visual observation or the like in addition to the movement path image, the operator can easily confirm whether the selected too lest can be moved safely.

Further, the operator can actually move the selected tool rest by pressing down the "execution" key or a route selection key after confirming whether the selected tool rest can be moved safely by checking the positional relationship of the selected tool rest and the other structures in addition to the displayed movement path image as described above, and therefore the selected tool rest can be moved more safely.

Further, since a plurality of movement paths for moving the selected tool rest are set by the movement path setting unit 32 and an image relating to the set plurality of movement paths is displayed in the image display area 41, and one movement path can selected from among the plurality of movement paths, the operator can appropriately select a movement path as necessary, for example, selecting a movement path attaching more importance to safety or selecting a movement path having a shorter movement distance.

Further, in the machine tool 1 of this embodiment, the movement path setting unit 32 verifies whether interference occurs for each of the movement paths, and then selects only movement paths where no interference occurs, and images relating to only the selected movement paths where no interference occurs are displayed as selectable movement paths in the image display area 41. Therefore, the selected tool rest to be operated can be moved through a safe movement path where no interference occurs.

Further, in the machine tool 1 of this embodiment, an end point to which the selected tool rest is moved can be designated on the image display area 41 of the touch panel 39. Therefore, the operator can arbitrarily and easily set a position to which the selected tool rest is moved.

Thus, one embodiment of the present disclosure has been described above. However, a specific mode in which the present disclosure can be implemented is not limited thereto.

For example, although, in the above-described embodiment, the movement path setting unit 32 is configured to verify whether interference occurs or not for each of the movement paths and then select movement paths where no interference occurs, the present disclosure is not limited thereto. The movement path setting unit 32 may be configured to verify whether interference occurs or not for each of the movement paths, and then set, for a movement path where interference occurs, an avoidance path for avoiding the interference and change the movement path to the set avoidance path.

Figure 7:
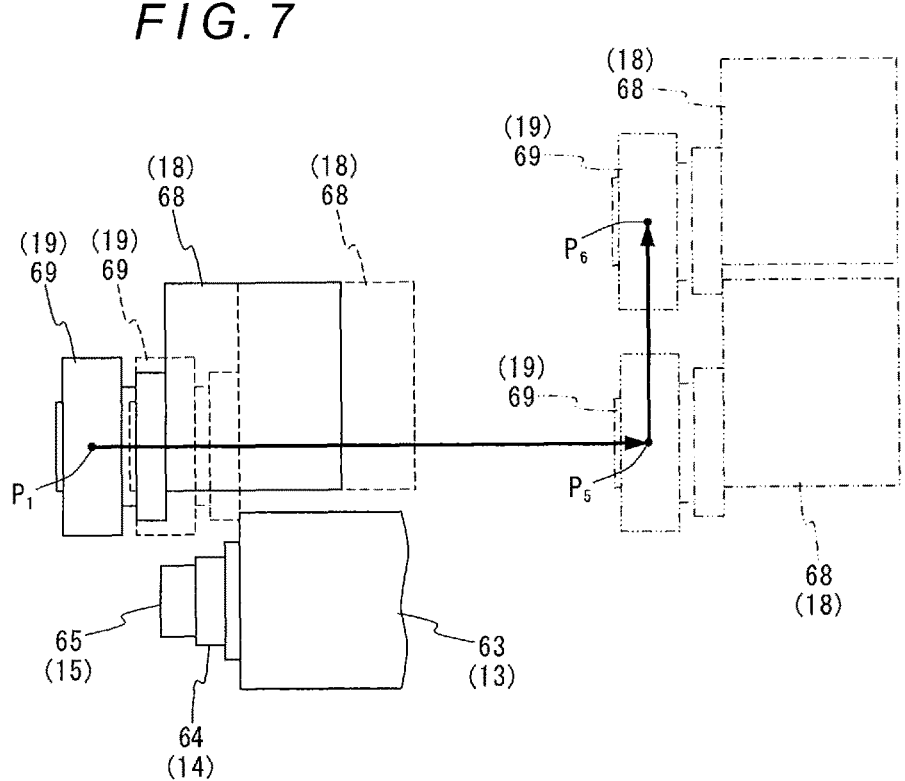
FIG. 7 is an illustration for explaining an interference avoidance processing in another embodiment of the present disclosure.
Figure 8:
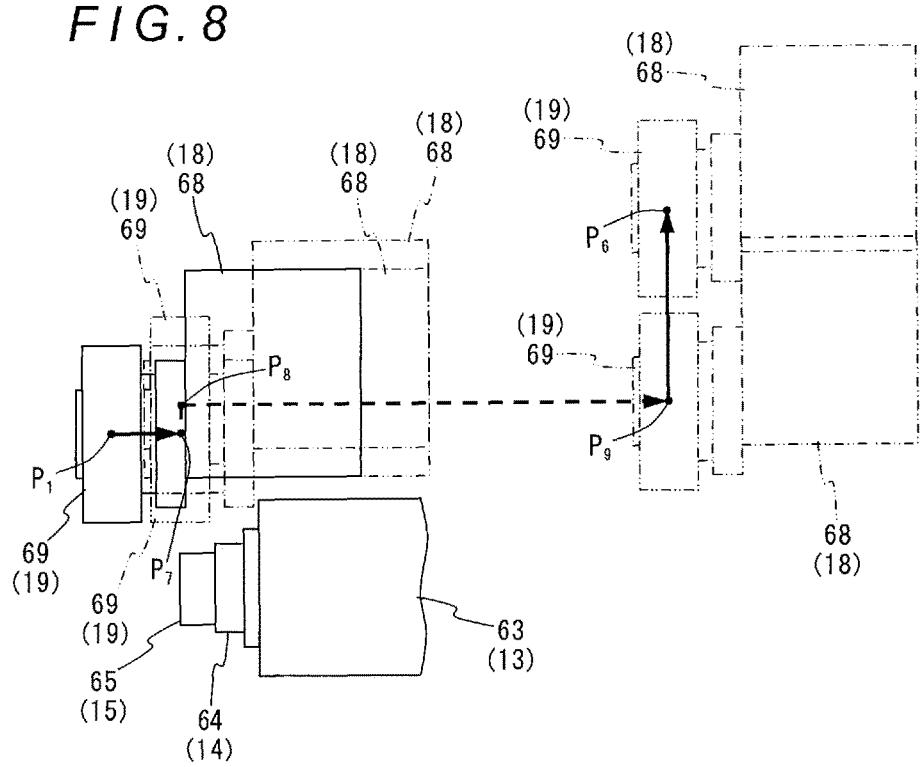
FIG. 8 is an illustration for explaining the interference avoidance processing in another embodiment of the present disclosure.

For example, as shown in FIG. 7 illustrating the movement path route B illustrated in FIG. 2 in a plane, when the second tool rest 18 is moved from $P_1$ to $P_5$ and $P_6$ in this order, the second tool rest 18 interferes with the second headstock 13 while moving from $P_1$ to $P_5$. In this case, as illustrated in FIG. 8, the movement path setting unit 32 calculates a movement path for avoiding the interference, i.e., a path through which the second tool rest 18 moves from $P_1$ to $P_7$, $P_8$, $P_9$, and $P_6$ in this order, and changes the movement path route B to this interference avoidable movement path.

When thus configured, a movable structure to be operated can be moved safely through a movement path where no interference occurs. It is noted that, as a matter of course, the method of calculating an avoidance path is not limited to the example illustrated in FIG. 8 and may be any method as long as interference can be avoided.

Further, the image generation unit 27 may be configured to generate, at predetermined time intervals, images in which the three-dimensional model image of to a movable structure to be operated moves along a movement path set by the movement path setting unit 32, and the image display unit 28 may be configured to sequentially display the generated images on the image display unit 41. When thus configured, the operator can confirm the movement state of the movable structure by looking at the images in which the movable structure moves along the movement path.

Further, although, in the above-described embodiment, the movement path setting unit 32 is configured to, when setting movement paths for zero return, set the movement paths under setting conditions different from setting conditions in the numerical control unit 22, the present disclosure is not limited thereto. The movement path setting unit 32 may be configured to set the movement paths under the same setting conditions as those in the numerical control unit 22.

Further, although, in the above-described embodiment, the selection keys for selecting a tool rest to be operated are set as softkeys and the selection keys are provided separately from the selection keys provided in the jog feed operation unit 37, the present disclosure is not limited thereto and a configuration in which the selection keys provided in the jog feed operation unit 37 are shared may be adopted.

What is claimed is:
1. A machine tool comprising:
one or more movable structures,
a drive mechanism unit driving the movable structures,
a numerical control unit controlling an operation of the drive mechanism unit,
an external input unit including a dedicated operation key for manually inputting an operation signal which is set to move the movable structures and is associated with at least a movement end point, the external input unit further being configured to input the operation signal from the operation key to the numerical control unit, a display unit displaying an image, a display control unit operatively coupled to the display unit and configured to control the image displayed on the display unit, an input control unit processing a signal input from the external input unit, and a movement path setting unit configured to generate a set movement path for moving the movable structure to the movement end point based on the operation signal manually input from the external input unit, wherein the display control unit is further configured to receive the set movement path from the movement path setting unit, generate the image based on the set movement path to include a symbol indicative of the set movement path to the movement end point, and display the image with the symbol on the display unit.

2. The machine tool according to claim 1, wherein:

the external input unit further includes an execution key for inputting an execution signal for executing movement of the movable structure corresponding to the operation signal, the input control unit is configured to transmit the operation signal and the execution signal input from the external input unit to the numerical control unit, and the numerical control unit is configured to receive the operation signal and the execution signal and move the movable structure along the set movement path corresponding to the operation signal.

3. The machine tool according to claim 1, wherein:

the movement path setting unit is configured to generate a plurality of set movement paths until the movable structure reaches the movement end point in accordance with a plurality of predetermined setting conditions, the display control unit is configured to receive the plurality of set movement paths from the movement path setting unit, generate the image based on the set movement path to include a plurality of symbols indicative of the plurality of set movement paths to the movement end point, and display the image with the plurality of symbols on the display unit, the external input unit includes a selection key for inputting a selection signal for selecting one from among the plurality of symbols indicative of the plurality of set movement paths displayed on the display unit, the input control unit is configured to, when a selection signal is input from the external input unit, transmit position data relating to the selected movement path and an execution signal to the numerical control unit, and the numerical control unit is configured to receive the position data relating to the selected movement path and the execution signal and move the movable structure along the selected movement path.

4. The machine tool according to claim 3, wherein the movement path setting unit is configured to generate at least a set movement path having a shortest movement time.

5. The machine tool according to claim 3, wherein:

the plurality of set movement paths generated by the movement path setting unit includes at least a single-axis movement path formed by connecting one or more paths which are each along a single movement axis, and the symbol generated by the display control unit is indicative of the single-axis movement path, and the display control unit is further configured to display an image relating to the movement axes corresponding to the single-axis movement path on the display unit simultaneously with displaying the symbol indicative of the single-axis movement path.

6. The machine tool according to claim 1, further comprising a model data storage unit storing therein at least model data relating to the movable structures, wherein:

the image generated by the display control unit further includes an image of the movable structures based on the model data stored in the model data storage unit, and the display control unit further being configured to generate and display on the display unit an image of the movable structure moving in accordance with the set movement path.

7. The machine tool according to claim 2, further comprising a model data storage unit storing therein at least model data relating to the movable structures, wherein:

the image generated by the display control unit further includes an image of the movable structures based on the model data stored in the model data storage unit, and the display control unit further being configured to generate and display on the display unit an image of the movable structure moving in accordance with the set movement path.

8. The machine tool according to claim 3, further comprising a model data storage unit storing therein at least model data relating to the movable structures, wherein:

the image generated by the display control unit further includes an image of the movable structures based on the model data stored in the model data storage unit, and the display control unit further being configured to generate and display on the display unit an image of the movable structure moving in accordance with each of the set movement paths.

9. The machine tool according to claim 4, further comprising a model data storage unit storing therein at least model data relating to the movable structures, wherein:

the image generated by the display control unit further includes an image of the movable structures based on the model data stored in the model data storage unit, and the display control unit further being configured to generate and display on the display unit an image of the movable structure moving in accordance with each of the set movement paths.

10. The machine tool according to claim 5, further comprising a model data storage unit storing therein at least model data relating to the movable structures, wherein:

the image generated by the display control unit further includes an image of the movable structures based on the model data stored in the model data storage unit, and the display control unit further being configured to generate and display on the display unit an image of the movable structure moving in accordance with each of the set movement paths.

11. The machine tool according to claim 1, further comprising a model data storage unit storing therein at least model data relating to the movable structures and model data relating to other structures having a possibility of interference with the movable structures within movable areas of the movable structures, wherein:

the movement path setting unit is configured to perform a processing of reading out the model data stored in the model data storage unit and generating a virtual model in which models relating to the movable structures and the other structures are arranged in a virtual space to have a positional relationship before movement of the movable structure, and then moving, along the set movement path, the model relating to the movable structure corresponding to the movement path in the virtual space and thereby verifying whether a structure which interferes with the movable structure exists or not, and in a case where interference occurs, a processing of setting an avoidance path for avoiding the interference, and then changing the set movement path to the set avoidance path.

12. The machine tool according to claim 2, further comprising a model data storage unit storing therein at least model data relating to the movable structures and model data relating to other structures having a possibility of interference with the movable structures within movable areas of the movable structures, wherein:
the movement path setting unit is configured to perform a processing of reading out the model data stored in the model data storage unit and generating a virtual model in which models relating to the movable structures and the other structures are arranged in a virtual space to have a positional relationship before movement of the movable structure, and then moving, along the set movement path, the model relating to the movable structure corresponding to the movement path in the virtual space and thereby verifying whether a structure which interferes with the movable structure exists or not, and in a case where interference occurs, a processing of setting an avoidance path for avoiding the interference, and then changing the set movement path to the set avoidance path.

13. The machine tool according to claim 3, further comprising a model data storage unit storing therein at least model data relating to the movable structures and model data relating to other structures having a possibility of interference with the movable structures within movable areas of the movable structures, wherein:
the movement path setting unit is configured to perform a processing of reading out the model data stored in the model data storage unit and generating a virtual model in which models relating to the movable structures and the other structures are arranged in a virtual space to have a positional relationship before movement of the movable structure, and then moving, along each of the set movement paths, the model relating to the movable structure corresponding to the movement path in the virtual space and thereby verifying whether a structure which interferes with the movable structure exists or not, and in a case where interference occurs, a processing of setting an avoidance path for avoiding the interference, and then changing the set movement path to the set avoidance path.

14. The machine tool according to claim 4, further comprising a model data storage unit storing therein at least model data relating to the movable structures and model data relating to other structures having a possibility of interference with the movable structures within movable areas of the movable structures, wherein:
the movement path setting unit is configured to perform a processing of reading out the model data stored in the model data storage unit and generating a virtual model in which models relating to the movable structures and the other structures are arranged in a virtual space to have a positional relationship before movement of the movable structure, and then moving, along each of the set movement paths, the model relating to the movable structure corresponding to the movement path in the virtual space and thereby verifying whether a structure which interferes with the movable structure exists or not, and in a case where interference occurs, a processing of setting an avoidance path for avoiding the interference, and then changing the set movement path to the set avoidance path.

15. The machine tool according to claim 5, further comprising a model data storage unit storing therein at least model data relating to the movable structures and model data relating to other structures having a possibility of interference with the movable structures within movable areas of the movable structures, wherein:
the movement path setting unit is configured to perform a processing of reading out the model data stored in the model data storage unit and generating a virtual model in which models relating to the movable structures and the other structures are arranged in a virtual space to have a positional relationship before movement of the movable structure, and then moving, along each of the set movement paths, the model relating to the movable structure corresponding to the movement path in the virtual space and thereby verifying whether a structure which interferes with the movable structure exists or not, and in a case where interference occurs, a processing of setting an avoidance path for avoiding the interference, and then changing the set movement path to the set avoidance path.

16. The machine tool according to claim 3, further comprising a model data storage unit storing therein at least model data relating to the movable structures and model data relating to other structures having a possibility of interference with the movable structures within movable areas of the movable structures, wherein:
the movement path setting unit is configured to read out the model data stored in the model data storage unit and generate a virtual model in which models relating to the movable structures and the other structures are arranged in a virtual space to have a positional relationship before the movement of the movable structure, then move, along each of the set movement paths, the model of the movable structure corresponding thereto in the virtual space and thereby verify whether a structure which interferes with the movable structure exists or not, and then select a movement path where no interference occurs, and
the image generated by the display control unit includes only a symbol relating to the movement path selected as a noninterference path.

17. The machine tool according to claim 4, further comprising a model data storage unit storing therein at least model data relating to the movable structures and model data relating to other structures having a possibility of interference with the movable structures within movable areas of the movable structures, wherein:
the movement path setting unit is configured to read out the model data stored in the model data storage unit and generate a virtual model in which models relating to the movable structures and the other structures are arranged in a virtual space to have a positional relationship before the movement of the movable structure, then move, along each of the set movement paths, the model of the movable structure corresponding thereto in the virtual space and thereby verify whether a structure which interferes with the movable structure exists or not, and then select a movement path where no interference occurs, and
the image generated by the display control unit includes only a symbol relating to the movement path selected as a noninterference path.

18. The machine tool according to claim 5, further comprising a model data storage unit storing therein at least model data relating to the movable structures and model data relating to other structures having a possibility of interference with the movable structures within movable areas of the movable structures, wherein:

the movement path setting unit is configured to read out the model data stored in the model data storage unit and generate a virtual model in which models relating to the movable structures and the other structures are arranged in a virtual space to have a positional relationship before the movement of the movable structure, then move, along each of the set movement paths, the model of the movable structure corresponding thereto in the virtual space and thereby verify whether a structure which interferes with the movable structure exists or not, and then select a movement path where no interference occurs, and the image generated by the display control unit includes only a symbol relating to the movement path selected as a noninterference path.

19. The machine tool according to claim 11, wherein the image generated by display control unit further includes an image of the movable structures based on the model data relating to the movable structures stored in the model data storage unit, and the display control unit further being configured to generate and display on the display unit an image of the movable structure moving in accordance with the set movement path.

20. The machine tool according to claim 16, wherein the image generated by the display control unit further includes an image of the movable structures based on the model data relating to the movable structures stored in the model data storage unit, and the display control unit further being configured to generate and display on the display unit an image of the movable structure moving in accordance with each of the set movement paths.

21. The machine tool according to claim 1, wherein:
the display unit comprises a touch panel, and
the movement end point is specified by a position signal input from the touch panel.

* * * * *